Patented Jan. 6, 1942

2,269,216

UNITED STATES PATENT OFFICE 2,269,216

POLYVINYL ACETAL RESIN

James G. McNally and Russel H. Van Dyke, Rochester, N. Y., assignors to Eastman Kodak Company, Rochester, N. Y., a corporation of New Jersey No Drawing. Application January 29, 1938, Serial No. 187,717

16 Claims. (Cl. 260—73)

This invention relates to resins and more particularly to what can be called polyvinyl acetal resins in which the acetal linkages are formed in part from aromatic aldehydes and in part from aliphatic aldehydes and/or cyclic ketones. More accurately, the resins of this invention can be called polyvinyl acetal resins in which the acetal linkages are formed in part from aromatic aldehyde acetal groups and in part from aliphatic aldehyde acetal groups and/or cyclic ketone acetal groups. This application is a continuation-in-part of our copending application Serial No. 47,472, filed October 30, 1935.

Simple polyvinyl acetal resins (i. e. polyvinyl acetal resins in which the acetal linkages are formed from but one kind of acetal group) have been prepared from polyvinyl alcohol by condensation of aldehydes or cyclic ketones therewith, in the presence of an acetal condensation catalyst. Simple polyvinyl acetal resins have also been prepared by concomitantly deesterifying a polyvinyl ester and condensing the deesterified product with aldehydes, in the presence of a deesterification catalyst, the deesterification catalyst serving to accelerate also the condensation of the aldehyde with the deesterified product. The polyvinyl acetaldehyde acetal resins, prepared from polyvinyl alcohol and acetaldehyde for example, are probably the most interesting of the simple polyvinyl acetal resins. These acetaldehyde acetal resins appeared to be useful for a variety of purposes in the plastics field. For example, these acetaldehyde acetal resins can be cast from ordinary simple solutions into the form of transparent film or sheet. However, the film or sheet is too brittle to be adapted commercially to certain uses; for instance, the film or sheet is too brittle to serve as a support for light-sensitive photographic coatings. Efforts to decrease the brittleness of such resins by changing the chemical composition thereof, viz., by increasing the hydroxyl group content, resulted in resins which were too water susceptible to be employed in manufacturing film or sheet for the aforesaid purpose. Formaldehyde acetal resins have many properties desirable in plastic materials, but possess a peculiar affinity for the relatively few organic solvents in which they are soluble, which characteristic practically precludes their adaptation to a number of commercial processes. Butyraldehyde acetal resins are fairly thermoplastic substances, so that their use is considerably limited. Benzaldehyde acetals cannot be prepared in a form suitable for wide usage in the plastics field by means of the prior art processes. The benzaldehyde acetals prepared by the prior art processes are of very limited solubility in organic solvents.

We have now found a new group of polyvinyl acetal resins which possess new characteristics permitting the resins to be adapted commercially to a number of processes. In our new resins, the acetal linkages are formed in part from aromatic aldehyde acetal linkages and in part from aliphatic aldehyde acetal linkages and/or cyclic ketones. By means of our invention, aliphatic aldehyde acetals having improved stiffness characteristics, reduced moisture susceptibility and reduced thermoplasticity can be prepared. By means of our invention, polyvinyl acetals containing benzaldehyde acetal linkages and having improved solubilities in organic solvents have been prepared.

It is, accordingly, an object of our invention to provide new polyvinyl acetal resins. It is a further object of our invention to provide new polyvinyl acetal resins in which the acetal linkages are formed in part from aromatic aldehyde acetal groups and in part from aliphatic aldehyde acetal and/or cyclic ketone acetal linkages. It is a still further object to provide polyvinyl acetal resins for use in the plastics field and in which the acetal linkages are formed at least in part from aromatic aldehyde acetal linkages. It is a still further object of our invention to provide a process for preparing our new resins. Other more specific objects will become apparent hereinafter.

According to our invention, we prepare our new resins by treating a polyvinyl compound containing hydroxyl groups with at least one aliphatic aldehyde and/or at least one cyclic ketone, in the presence of an acetal condensation catalyst. We can employ a polyvinyl ester as a starting material and concomitantly deesterify the ester and condense the deesterified product with at least one aromatic aldehyde and with at least one aliphatic aldehyde and/or at least one cyclic ketone. Advantageously at least ten mole percent of the total acetal linkages in our new resins are formed from aromatic aldehyde acetal groups. In a preferred group of our new resins also described in our copending application Serial No. 187,718, filed of even date herewith, the hydroxyl group content is not more than that equivalent to about 12 or 15% by weight of polyvinyl alcohol and is beneficially 8% or less, and the ester group content, if any, is not more than that equivalent to about ten percent by weight of polyvinyl ester and is beneficially 1 to 5% or less. As the mole percent of the aromatic aldehyde acetal linkages in our resins is increased, the hydroxyl group content can be increased without loss of desirable resinous properties. A particularly useful group of our new resins are those in which the acetal linkages are formed in part from benzaldehyde acetal groups and in part from aliphatic aldehyde acetal groups containing not more than four carbon atoms.

While the process of preparing our new resins is subject to variation, particularly as respects the nature and quantity of the starting polyvinyl compound employed, the nature and quantity of the aromatic aldehyde and aliphatic aldehyde or cyclic ketone employed, the nature and quantity of acetal condensation catalyst employed, the nature and quantity of the deesterification agent employed, if any, the nature and quantity of deesterification catalyst employed, if any, and the method of isolation and purification of the resins, the following examples will serve to illustrate the mode of obtaining our new resins. In the examples, the degree of polymerization of the polyvinyl ester employed is indicated by stating the viscosity in centipoises of its 10% solution in benzene at 25° C.

EXAMPLE 1.—*Polyvinyl formaldehyde benzaldehyde acetal resin*

50 g. of polyvinyl acetate (30 centipoises) were added to 62 cc. of 95% ethyl alcohol, 15 cc. of water and 2 cc. of hydrochloric acid (sp. g. 1.18). The mixture was heated at 70° C. until a solution was obtained. At this point 6 g. of trioxymethylene were added and heating at 70° C. was continued for about sixteen hours. At the end of this time 13 g. of benzaldehyde were added and heating was continued at 70° C. for about 24.5 hours. At the end of this time, the reaction mixture was poured into hot water to precipitate the resin. It was thoroughly washed with water and dried. The resin was soluble in a mixture of ethylene chloride (40% by volume) and methyl alcohol (60%). A polyvinyl acetaldehyde benzaldehyde acetal resin can be prepared in the same manner employing 8.8 g. of paraldehyde instead of 6 g. of trioxymethylene. A polyvinyl butyraldehyde benzaldehyde acetal resin can be prepared in the same manner employing 15.2 g. of butyraldehyde instead of 6 g. of trioxymethylene.

EXAMPLE 2.—*Polyvinyl formaldehyde benzaldehyde acetal resin*

50 g. of polyvinyl acetate (30 centipoises) were added to 62 cc. of 95% ethyl alcohol, 15 cc. of water and 2 cc. of hydrochloric acid (sp. g. 1.18). The mixture was heated at 70° C. until a solution was obtained. At this point 3 g. of trioxymethylene were added and heating was continued at about 70° C. for about sixteen hours. At the end of this time 25 g. of benzaldehyde were added and heating at 70° C. was continued for about twenty-five hours. At the end of this time the reaction mixture was poured into hot water to precipitate the resin. It was thoroughly washed with water and dried. The resin was soluble in a mixture of ethylene chloride (40% by volume) and methyl alcohol (60%).

EXAMPLE 3.—*Polyvinyl formaldehyde furfuraldehyde acetal resins*

50 g. of polyvinyl acetate (30 centipoises) were dissolved in 62 cc. of 95% ethyl alcohol, 15 cc. of water and 2 cc. of hydrochloric acid (sp. g. 1.18). The mixture was heated at 70° C. until solution was complete. At this point 6 g. of trioxymethylene were added and heating at 70° C. was continued for about 16.5 hours. At the end of this time 12 g. of furfural (furfuraldehyde) were added and heating at 70° C. was continued for about twenty-three hours. The reaction mixture was poured into hot water to precipitate the resin. The resin was thoroughly washed with water and dried.

EXAMPLE 4.—*Polyvinyl formaldehyde-furfuraldehyde acetal resin*

50 g. of polyvinyl acetate (30 centipoises) were dissolved in 62 cc. of 95% ethyl alcohol, 15 cc. of water and 2 cc. of hydrochloric acid (sp. g. 1.18). The mixture was heated at 70° C. until solution was complete. At this point 3 g. of trioxymethylene were added and heating at 70° C. was continued for about 16.5 hours. At the end of this time 25 g. of furfuraldehyde were added and heating at 70° C. was continued for about 7.5 hours. The reaction mixture was poured into hot water to precipitate the resin. The resin was thoroughly washed with water and dried.

EXAMPLE 5.—*Polyvinyl acetaldehyde-benzaldehyde acetal resin*

200 g. of polyvinyl acetate (25 centipoises) were dissolved in 750 cc. of 95% ethyl alcohol. To this solution were added 52 g. (1.15 mol.) of acetaldehyde and 142 g. (1.15 mol.) of benzaldehyde and 50 g. of hydrochloric acid (sp. g. 1.18). This mixture was allowed to stand at 40° C. for about four days. At the end of this time the reaction mixture was diluted with 2.5 times its volume of 95% ethyl alcohol. The diluted reaction mixture was poured into water to precipitate the resin. The resin was thoroughly washed with water and dried. This resin had an acetate group content equivalent to about 5.6 percent by weight of polyvinyl acetate and a hydroxyl group content equivalent to 13.4 percent by weight of polyvinyl alcohol.

EXAMPLE 6.—*Polyvinyl acetaldehyde benzaldehyde acetal resin*

25 lbs. of polyvinyl acetate were dissolved in 75 lbs. of 95% ethyl alcohol. To this solution were added 11.25 lbs. of benzaldehyde, 11.25 lbs. of paraldehyde and 6.25 lbs. of hydrochloric acid (sp. g. 1.18). The solution was allowed to stand about four days at 40° C. At the end of this time the solution was diluted with twice its volume of a 1:1 (volumes) mixture of 95% ethyl alcohol and acetic acid. The diluted reaction mixture was poured into cold water to precipitate the resin. The precipitated resin was washed with cold water and dried. The resin had a hydroxyl group content equivalent to about 9.25 percent by weight of polyvinyl alcohol and an acetate group content equivalent to about 2 percent by weight of polyvinyl acetate.

EXAMPLE 7.—*Polyvinyl butyraldehyde-benzaldehyde acetal resin*

160 g. of polyvinyl acetate (45 centipoises) were dissolved in 960 g. of 95% ethyl alcohol. To this solution were added 118 g. of benzaldehyde and 186 g. of butyraldehyde and 80 g. of hydrochloric acid (sp. g. 1.18). The resulting solution was allowed to stand for about eight days at 40° C. The reaction mixture was then diluted with about twice its volume of 95% ethyl alcohol. The diluted reaction mixture was poured into cold water to precipitate the resin. The resin was thoroughly washed with water and dried. The resin had a hydroxyl group content equivalent to about 7.4 percent by weight of polyvinyl alcohol and an acetate group content equivalent to about 5.65 percent by weight of polyvinyl acetate.

In a similar manner, employing 79.8 g. of benzaldehyde instead of 118 g. and 214 g. of butyraldehyde instead of 186 g., a resin having a hydroxyl group content equivalent to about 6.1 percent by weight of polyvinyl alcohol and an acetate group content equivalent to about 4.5 percent by weight of polyvinyl acetate was obtained.

Likewise in a similar manner, employing 158 g. of benzaldehyde instead of 118 g. and 162 g. of butyraldehyde instead of 186 g. a resin having a hydroxyl group content equivalent to about 9.8 percent by weight of polyvinyl alcohol and an acetate group content equivalent to about 5.5 percent by weight of polyvinyl alcohol.

EXAMPLE 8.—*Polyvinyl acetaldehyde-veratraldehyde acetal resin*

150 g. of polyvinyl acetate (25 centipoises), were dissolved in 375 cc. of ethyl alcohol (95%). To this solution were added 87 g. of veratraldehyde, 53.2 g. of paraldehyde and 37.5 g. of hydrochloric acid (sp. g. 1.18). The mixture was allowed to stand at 40° C. for about four days. The reaction mixture was diluted with one and a quarter times its volume of ethyl alcohol (95%). The diluted reaction mixture was poured into water to precipitate the resin. The resin was thoroughly washed with water and dried at 140° to 160° F. The resin contained an acetate group content equivalent to about 4.2 percent by weight of polyvinyl acetate and 11.0 percent by weight of polyvinyl alcohol. Veratraldehyde is the common name for 3,4-dimethoxybenzaldehyde.

EXAMPLE 9.—*Polyvinyl acetaldehyde-furfuraldehyde acetal resin*

150 g. of polyvinyl acetate (25 centipoises) were dissolved in 375 g. of ethyl alcohol (95%). To this solution were added 66.4 g. of paraldehyde and 46.1 g. of furfuraldehyde and 37.5 g. of hydrochloric acid (sp. g. 1.18). The mixture was allowed to stand at 40° C. for about three days. The reaction mixture was diluted with twice its volume of ethyl alcohol. The diluted reaction mixture was poured into water to precipitate the resin. The resin was thoroughly washed with water and dried at 140° to 160° F. The resin contained a hydroxyl group content equivalent to about 11.2 percent by weight of polyvinyl alcohol and an acetate group content equivalent to about 3.9 percent by weight of polyvinyl acetate.

EXAMPLE 10.—*Polyvinyl acetaldehyde-furfuraldehyde acetal resin*

150 g. of polyvinyl acetate (25 centipoises) were dissolved in 375 g. of ethyl alcohol (95%). To this solution were added 69.2 g. of paraldehyde, 16.6 g. of furfuraldehyde and 37.5 g. of hydrochloric acid (sp. g. 1.18). The mixture was allowed to stand at 40° C. for three days. The reaction mixture was diluted with twice its volume of ethyl alcohol. The diluted reaction mixture was poured into water to precipitate the resin. The resin was thoroughly washed with water and dried at 140° to 160° F. The resin contained a hydroxyl group content equivalent to about 8.6 percent by weight of polyvinyl alcohol and an acetate group content equivalent to about 3.9 percent by weight of polyvinyl acetate.

EXAMPLE 11.—*Polyvinyl acetaldehyde-o-chlorobenzaldehyde acetal resin*

150 parts of polyvinyl acetate (25 centipoises) were dissolved in 375 parts of 95% ethyl alcohol. To this solution were added with stirring 73 parts of o-chlorobenzaldehyde and 54 parts of paraldehyde and 37.5 parts of hydrochloric acid (sp. g. 1.18). The resulting solution was allowed to stand at about 40° C. for about 5 days. At the end of this time the reaction mixture was poured into water to precipitate the resin. The resin was thoroughly washed with water and dried at 140° to 160° F. This resin contained an acetate group content equivalent to about 2 percent by weight of polyvinyl alcohol and a hydroxyl group content equivalent to about 9 percent by weight of polyvinyl alcohol.

EXAMPLE 12.—*Polyvinyl acetaldehyde-m-nitrobenzaldehyde acetal resin*

150 parts of polyvinyl acetate (25 centipoises) were dissolved in 375 parts of 95% ethyl alcohol. To this solution were added with stirring 79 parts of m-nitrobenzaldehyde and 54 parts of paraldehyde and 37.5 parts of hydrochloric acid (sp. g. 1.18). The resulting solution was allowed to stand at about 40° C. for about 5 days. At the end of this time, the reaction mixture was poured into water to precipitate the resin. The resin was thoroughly washed with water and dried at 140° to 160° F. This resin contained an acetate group content equivalent to about 4 percent by weight of polyvinyl acetate and a hydroxyl group content equivalent to about 5 percent by weight of polyvinyl alcohol. The resins of Examples 11 and 12 are the invention of Martti Salo (see his application Serial No. 263,185, filed March 21, 1939).

The rates of reaction of the various aldehydes and cyclic ketones are generally different, depending upon the nature of the aldehydes and/or cyclic ketones and the conditions employed. The only satisfactory method of determining what ratio of aldehydes and/or cyclic ketones in the reaction mixture produces a resin of desired ratio of aldehyde and/or cyclic ketone acetal groups is to carry out a test preparation, isolate and purify the resin and determine by analysis the ratio of aldehyde and/or cyclic ketone acetal groups in the resin. Generally, in our new resins, each acetal group constitutes at least about ten mole percent of the total acetal linkages.

The polyvinyl esters employed in our process can be of any desired viscosity. Polyvinyl esters of viscosities ranging from 15 to 45 are readily available.

When preparing our new resins from polyvinyl alcohols, the polyvinyl alcohol is advantageously suspended in a lower aliphatic alcohol, such as isopropyl for example, and to the suspension the aldehydes and/or cyclic ketones and acetal condensation catalyst added. Agitation of the reactants is necessary. Advantageously, however, our new resins are made from polyvinyl esters as illustrated in the above examples.

Acid deesterification catalysts are well known and any of these can be employed in our process. Mineral acids, such as hydrochloric or sulfuric acid are advantageously employed. Trichloracetic and aromatic sulfonic acids for example are less satisfactory, because the deesterifications proceed more slowly in their presence. Acid deesterification catalysts are well known as acetal condensation catalysts. Acid reacting salts, such as aluminum and zinc chloride for example, are also well known acetal condensation catalysts. These salts, however, are are not suitable deesterification catalysts. Phosphoric acid is a well known deesterification catalyst. The quantity of deesterification and acetal condensation catalysts is important. Depending upon the nature of the catalyst, larger amounts tend to produce color in the resin.

As deesterification agents, anhydrous or aqueous lower aliphatic primary monohydric alcohols (i. e., those containing not more than four carbon atoms) are advantageously employed.

The polyvinyl ester employed is advantageously the readily available and less costly polyvinyl acetate. Polyvinyl formate is advantageously avoided. Polyvinyl propionate or benzoate can be employed, for example. The polyvinyl ester employed need not be a simple polymer, but can as well be a conjoint polymer, such as polyvinyl acetate-propionate, for example. Any polyvinyl compound having readily deesterifiable groups can be employed. When carrying out our process with a polyvinyl alcohol, any polyvinyl alcohol, such as that formed by partial or complete deesterification of a polyvinyl ester, can be employed.

The polyvinyl compound used as starting material must either have a substantial proportion of ester groups which deesterify readily to give hydroxyl groups, or the starting polyvinyl compound must have a substantial proportion of hydroxyl groups to begin with.

When either a polyvinyl ester or a polyvinyl alcohol is employed, the condensation with the aldehydes and/or cyclic ketones can best be carried out in the presence of an organic solvent, such as ethyl alcohol, acetone, acetic acid or ethyl acetate. Any reaction medium which gives rise to a single, homogeneous phase and hence to a rapid and smooth reaction will suffice. An excess of aldehydes and/or cyclic ketones over that required to react with the polyvinyl compound is advantageously employed.

The quantity of materials used as deesterifying medium, viz., water and/or an alcohol, as well as the quantity and nature of materials used as diluents, viz., acetone, ethyl acetate and the like, have an effect on the resins produced. In the reaction of a polyvinyl ester with a plurality of aldehydes and/or cyclic ketones, if too little water is employed, the resulting resin tends to be colored. If too much water is present, the reaction mixtures give rise to a precipitate prior to the completion of the reaction.

The aldehydes and/or cyclic ketones employed can be the simple monomeric forms or polymeric forms. In the case of the lower aliphatic aldehydes, the polymeric forms are much more conveniently handled. The aldehydes and/or cyclic ketones can also be employed in the form of derivatives which function as the aldehydes or cyclic ketones under the conditions of the reaction. For example, acetaldehyde can be employed in the form of the diethyl acetal of acetaldehyde. If such derivatives are liquid in nature, an excess can be used, thereby providing a convenient reaction medium.

The polyvinyl alcohol or polyvinyl ester can be treated with a plurality of aldehydes and/or cyclic ketones simultaneously or the different carbonyl compounds can be added successively. We have found the properties of the resulting polyvinyl acetal resins differ according to whether the carbonyl compounds are reacted simultaneously or successively. When formaldehyde is employed, it is advantageously reacted substantially completely first, followed by the aromatic aldehyde.

In preparing our new resins containing higher mole percents of aromatic aldehydes, particularly benzaldehyde, we employ a solution of a polyvinyl ester in a lower aliphatic monohydric alcohol (i. e., one containing not more than four carbon atoms) and a large quantity of hydrochloric acid. Advantageously, the hydrochloric acid is equal to at least about twice the weight of the polyvinyl ester. The following example of the preparation of a simple polyvinyl benzaldehyde acetal resin is illustrative.

EXAMPLE 13.—*Polyvinyl benzaldehyde acetal resin*

50 g. of polyvinyl acetate (30 centipoises) were added to 20 cc. of water, 10 cc. of 95% ethyl alcohol and 100 cc. of hydrochloric acid (sp. g. 1.18). This mixture was allowed to stand at ordinary temperature (about 20° C.) until it was free from lumps. This required about 5.5 hours. At this point, 35 g. of benzaldehyde were added and the resulting mixture was allowed to stand at about 20° to 25° C. for about 19.5 hours. At the end of this time, the reaction mixture was treated with water and the resin washed with acetone to remove excess benzaldehyde. The resin was finally thoroughly washed with water. In a similar manner, formaldehyde-benzaldehyde acetal and other aliphatic aldehyde-benzaldehyde acetal resins can be prepared.

As illustrated in the above examples, these new resins can be prepared under various conditions of temperatures. Where temperatures above room temperature are employed, a means for preventing the loss of the volatile solvents used must be provided. At 70° C. a reflux condenser or closed reaction vessel serves this purpose.

The mixed polyvinyl acetal resins which show satisfactory solubility in organic solvents can be converted into film or sheet as indicated in various of the above examples. This is done by dissolving about 1 part by weight of the resin in from about 4 to 5 parts by weight of a suitable organic solvent, which may be a single solvent or a mixture of solvents, and the resulting solution or "dope" is coated out to desired thinness on a film forming surface, such as a glass or metal plate or table or revolving drum. When the solvent has evaporated (this can be conveniently accelerated by means of warm air) the resulting film or sheet is stripped from the film forming surface and subjected to curing (removal of excess solvent) by heating in warm air. Of the resulting cured films or sheets, several of those made from resins illustrated above are useful as supports for light-sensitive materials, for example, photographic emulsions.

Most of the herein described new resins are soluble in mixtures of alkylene chlorides, such as ethylene chloride, and high percentage oxygen compounds, such as lower aliphatic alcohols, lower aliphatic ketones, lower aliphatic esters, lower aliphatic acetals, lower aliphatic ethers, dioxane, etc. From such solvents, the resin can be coated out into film or sheet.

Plasticizers can be incorporated in the resins prior to formation of the film or sheet. The following plasticizers, among others, have been found to be compatible and otherwise satisfactory: tributyl phosphate, tricresyl phosphate, tribromophenol, dibutyl phthalate, diacetin, triacetin and mono-chloronaphthalene.

The herein described new resins are suitable for many purposes other than for the manufacture of transparent film or sheet and for molding. Those resins showing satisfactory solubility in organic solvents can be made up into varnishes or lacquers with or without the addition of other resinous bodies. Almost any property desired in the permanent coating resulting from such varnishes or lacquers can be obtained by selecting a suitable mixed polyvinyl acetal resin. These new mixed polyvinyl acetal resins and, more particularly, those of lower melting points, can be successfully applied to the manufacture of laminated sheets of materials, such as glass, cellulose nitrate, cellulose acetate or wood. These new resins can also be used to impregnate fabrics, wood and the like, for the purposes of waterproofing and preservation. These new resins can also be used to insulate conductors of electricity. In the field of textiles, these resins have a wide range of utility. Those containing a high hydroxyl group content can be used as dispersing, sizing or wetting agents. The resins containing a lower hydroxyl group content can be precipitated from solution in the form of threads or sheets alone, or in conjunction with cellulose derivatives. These new resins can also be extruded into the form of film or sheet. The resulting film or sheet made by extrusion as well as by coating from solutions of the resins can be laminated and pressed into the form of heavier sheeting or boards.

What we claim as our invention and desire to be secured by Letters Patent of the United States is:

1. A polyvinyl acetal resin in which the acetal linkages are formed in part from benzaldehyde acetal groups and in part from aliphatic aldehyde acetal groups, said resin having a hydroxyl group content equivalent to not more than about fifteen percent by weight of polyvinyl alcohol and an acetate group content equivalent to not more than about ten percent by weight of polyvinyl acetate.

2. A polyvinyl acetal resin in which the acetal linkages are formed in part from benzaldehyde acetal groups and in part from aliphatic aldehyde acetal groups having not more than four carbon atoms, said resin having a hydroxyl group content equivalent to not more than about fifteen percent by weight of polyvinyl alcohol and an acetate group content equivalent to not more than about ten percent by weight of polyvinyl acetate.

3. A polyvinyl acetal resin in which the acetal linkages are formed in part from formaldehyde acetal groups and in part from benzaldehyde acetal groups, said resin having a hydroxyl group content equivalent to not more than about fifteen percent by weight of polyvinyl alcohol and an acetate group content equivalent to not more than about ten percent by weight of polyvinyl acetate.

4. A polyvinyl acetal resin in which the acetal linkages are formed in part from furfuraldehyde acetal groups and in part from aliphatic aldehyde acetal groups, said resin having a hydroxyl group content equivalent to not more than about fifteen percent by weight of polyvinyl alcohol and an acetate group content equivalent to not more than about ten percent by weight of polyvinyl acetate.

5. A polyvinyl acetal resin in which the acetal linkages are formed in part from formaldehyde acetal groups and in part from furfuraldehyde acetal groups, said resin having a hydroxyl group content equivalent to not more than about fifteen percent by weight of polyvinyl alcohol and an acetate group content equivalent to not more than about ten percent by weight of polyvinyl acetate.

6. A polyvinyl acetal resin in which the acetal linkages are formed in part from acetal groups selected from the group consisting of aromatic aldehyde acetal groups and heterocyclic aldehyde acetal groups, and in part from aliphatic aldehyde acetal groups, said resin having a hydroxyl group content equivalent to not more than about fifteen percent by weight of polyvinyl alcohol and an ester group content equivalent to not more than about ten percent by weight of polyvinyl ester.

7. A polyvinyl acetal resin in which the acetal linkages are formed in part from acetal groups selected from the group consisting of aromatic aldehyde acetal groups and heterocyclic aldehyde acetal groups, and in part from aliphatic aldehyde acetal groups having not more than four carbon atoms, said resin having a hydroxyl group content equivalent to not more than about fifteen percent by weight of polyvinyl alcohol and an ester group content equivalent to not more than about ten percent by weight of polyvinyl ester.

8. A process for preparing polyvinyl acetal resins comprising reacting a polyvinyl ester with a cyclic aldehyde selected from the group consisting of aromatic aldehydes and heterocyclic aldehydes, and with an aliphatic aldehyde, in the presence of a deesterification medium and an acid deesterification catalyst, the reaction being carried out with all of the reactants and the reaction products in solution in the deesterification medium until there is obtained a polyvinyl acetal having an ester group content equivalent to not more than about ten percent by weight of polyvinyl ester and a hydroxyl group content equivalent to not more than about fifteen percent by weight of polyvinyl alcohol.

9. A process for preparing polyvinyl acetal resins comprising reacting a polyvinyl acetate with a cyclic aldehyde selected from the group consisting of aromatic aldehydes and heterocyclic aldehydes, and with an aliphatic aldehyde, in the presence of a deesterification medium and an acid deesterification catalyst, the reaction being carried out with all of the reactants and the reaction products in solution in the deesterification medium until there is obtained a polyvinyl acetal having an acetate group content equivalent to not more than about ten percent by weight of polyvinyl acetate and a hydroxyl group content equivalent to not more than about fifteen percent by weight of polyvinyl alcohol.

10. A process for preparing polyvinyl acetal resins comprising reacting a polyvinyl ester with a cyclic aldehyde selected from the group consisting of aromatic aldehydes and heterocyclic aldehydes, and with an aliphatic aldehyde, in the presence of a deesterification medium and an acid deesterification catalyst, said cyclic aldehyde and said aliphatice aldehyde being reacted successively, the reaction being carried out with all of the reactants and the reaction products in solution in the deesterification medium until there is obtained a polyvinyl acetal having an ester group content equivalent to not more than about ten percent by weight of polyvinyl ester and a hydroxyl group content equivalent to not more than about fifteen percent by weight of polyvinyl alcohol.

11. A process for preparing polyvinyl acetal resins comprising reacting a polyvinyl ester, in solution in a lower aliphatic alcohol and in at least about twice the polyvinyl ester's weight of hydrochloric acid of about sp. g. 1.18, with a cyclic aldehyde selected from the group consisting of aromatic aldehydes and heterocyclic aldehydes, and with an aliphatic aldehyde, the reaction being carried out with all of the reactants and the reaction products in solution in the lower aliphatic alcohol until there is obtained a polyvinyl acetal having an ester group content equivalent to not more than about ten percent by weight of polyvinyl ester and a hydroxyl group content equivalent to not more than about fifteen percent by weight of polyvinyl alcohol.

12. A process for preparing polyvinyl acetal resins comprising reacting a polyvinyl acetate, in solution in a lower aliphatic alcohol and in at least about twice the polyvinyl acetate's weight of hydrochloric acid of about sp. g. 1.18, with a cyclic aldehyde selected from the group consisting of aromatic aldehydes and heterocyclic aldehydes, and with an aliphatic aldehyde, the reaction being carried out with all of the reactants and the reaction products in solution in the lower aliphatic alcohol until there is obtained a polyvinyl acetal having an acetate group content equivalent to not more than about ten percent by weight of polyvinyl acetate and a hydroxyl group content equivalent to not more than about fifteen percent by weight of polyvinyl alcohol.

13. A polyvinyl acetal resin in which the acetal linkages are formed in part from cyclic aldehyde acetal groups selected from the group consisting of aromatic aldehyde and heterocyclic aldehyde acetal groups, and in part from aliphatic aldehyde acetal groups having not more than four carbon atoms, the cyclic aldehyde acetal groups constituting at least ten mole percent of the total acetal linkages, said resin having a hydroxyl group content equivalent to not more than about fifteen percent by weight of polyvinyl alcohol and an acetate group content equivalent to not more than about ten percent by weight of polyvinyl acetate.

14. A polyvinyl acetal resin in which the acetal linkages are formed in part from benzaldehyde acetal groups and in part from aliphatic aldehyde acetal groups having not more than four carbon atoms, the benzaldehyde acetal groups constituting at least ten mole percent of the total acetal linkages, said resin having a hydroxyl group content equivalent to not more than about fifteen percent by weight of polyvinyl alcohol and an acetate group content equivalent to not more than about ten percent by weight of polyvinyl acetate.

15. A polyvinyl acetal resin in which the acetal linkages are formed in part from cyclic aldehyde acetal groups selected from the group consisting of aromatic aldehyde and heterocyclic aldehyde acetal groups, and in part from aliphatic aldehyde acetal groups, the cyclic aldehyde acetal groups constituting at least ten mole percent of the total acetal linkages, said resin having a hydroxyl group content equivalent to not more than about fifteen percent by weight of polyvinyl alcohol and an acetate group content equivalent to not more than about ten percent by weight of polyvinyl acetate.

16. A polyvinyl acetal resin in which the acetal linkages are formed in part from benzaldehyde acetal groups and in part from aliphatic aldehyde acetal groups having not more than four carbon atoms, the benzaldehyde acetal groups constituting at least ten mole percent of the total acetal linkages, said resin having a hydroxyl group content equivalent to not more than about fifteen percent by weight of polyvinyl alcohol and an acetate group content equivalent to not more than about five percent by weight of polyvinyl acetate.

JAMES G. McNALLY.
RUSSEL H. VAN DYKE.